(12) United States Patent
Muller et al.

(10) Patent No.: US 9,777,789 B2
(45) Date of Patent: Oct. 3, 2017

(54) DEVICE FOR DAMPING THE MOVEMENT OF A MOVABLY MOUNTED COMPONENT

(71) Applicant: FULTERER Gesellschaft mbH, Lustenau (AT)

(72) Inventors: Wolfgang Muller, Lustenau (AT); Edwin Grubel, Widnau (CH)

(73) Assignee: FULTERER Gesellschaft mbH, Lustenau (AT)

( * ) Notice: Subject to any disclaimer, the term of this patent is extended or adjusted under 35 U.S.C. 154(b) by 398 days.

(21) Appl. No.: 14/373,758

(22) PCT Filed: Dec. 13, 2012

(86) PCT No.: PCT/AT2012/000315
§ 371 (c)(1),
(2) Date: Jul. 22, 2014

(87) PCT Pub. No.: WO2013/110100
PCT Pub. Date: Aug. 1, 2013

(65) Prior Publication Data
US 2014/0353096 A1 Dec. 4, 2014

(30) Foreign Application Priority Data

Jan. 25, 2012 (AT) .................................. A 83/2012

(51) Int. Cl.
*F16F 7/04* (2006.01)
*F16F 9/12* (2006.01)
(Continued)

(52) U.S. Cl.
CPC .................. *F16F 7/04* (2013.01); *F16F 7/06* (2013.01); *F16F 9/12* (2013.01); *A47B 88/467* (2017.01); *A47B 2210/0091* (2013.01)

(58) Field of Classification Search
CPC ........ F16F 7/04; F16F 7/06; F16F 9/12; F16F 9/125; F16F 9/512; A47B 2210/0091;
(Continued)

(56) References Cited

U.S. PATENT DOCUMENTS 2,653,043 A 9/1953 Carlson
4,426,752 A * 1/1984 Nakayama ................ E05F 3/14
16/82

(Continued)

FOREIGN PATENT DOCUMENTS

AT 503877 1/2008
CA 2013633 10/1990
(Continued)

*Primary Examiner* — Robert A Siconolfi
*Assistant Examiner* — San Aung
(74) *Attorney, Agent, or Firm* — Volpe and Koenig, P.C.

(57) ABSTRACT

A device for damping the movement of a movably mounted component comprises a braking device which has a driven damper surface that cooperates with a secured damper surface to enclose a gap in which a viscous damping medium is present that causes a braking force of the braking device when the driven damper surface is rotated with respect to the secured damper surface, the braking force depending on the rotational speed of the driven damper surface. The device also has an additional braking device and a coupling. In the closed state of the coupling, at least one additional damper surface of the additional braking device driven by the movement of the component about an axis of the auxiliary braking device is rotated relative to at least one secured additional damper surface about the axis of the additional braking device, the additional braking device exerting an additional braking force. In the opened state of the coupling, the additional braking device is inactive. The coupling is activated by the braking force exerted by the braking device.

15 Claims, 9 Drawing Sheets

(51) Int. Cl.
*F16F 7/06* (2006.01)
*A47B 88/467* (2017.01)

(58) Field of Classification Search
CPC ............ A47B 2210/0094; A47B 88/04; A47B 88/047; E05B 65/462; E05B 65/464; E05B 17/0025; E05B 17/0041; E05B 2015/0493; B60N 3/083; B60N 3/102; Y10T 16/61; Y10T 16/276; Y10T 292/0948; Y10T 292/1078
USPC .................................................. 188/271, 272
See application file for complete search history.

(56) References Cited

U.S. PATENT DOCUMENTS

| | | | |
|---|---|---|---|
| 4,603,239 A | 7/1986 | Ishii | |
| 4,697,673 A * | 10/1987 | Omata | E05F 3/14 |
| | | | 16/52 |
| 4,732,434 A | 3/1988 | Hartrum | |
| 4,830,151 A | 5/1989 | Numata | |
| 5,143,432 A | 9/1992 | Ohshima et al. | |
| 5,240,318 A | 8/1993 | Schroder et al. | |
| 5,277,282 A | 1/1994 | Umemura | |
| 5,303,994 A | 4/1994 | Elsholz | |
| 5,335,563 A * | 8/1994 | Yamamoto | B60T 7/045 |
| | | | 188/290 |
| 5,460,252 A | 10/1995 | Kosugi et al. | |
| 5,887,930 A * | 3/1999 | Klein | B62D 25/12 |
| | | | 296/37.12 |
| 6,095,262 A | 8/2000 | Chen | |
| 6,095,626 A | 8/2000 | Lautenschläger | |
| 6,312,186 B1 | 11/2001 | Rock et al. | |
| 6,866,588 B2 | 3/2005 | Doornbos | |
| 7,032,985 B1* | 4/2006 | Ichioka | B60N 3/083 |
| | | | 16/51 |
| 7,815,267 B1 | 10/2010 | Frousiakis | |
| 2002/0078529 A1 | 6/2002 | Schwarz | |
| 2002/0101014 A1 | 8/2002 | Kurihara et al. | |
| 2002/0157495 A1* | 10/2002 | Goto | B60T 7/06 |
| | | | 74/512 |
| 2006/0061245 A1 | 3/2006 | Huber et al. | |
| 2006/0113154 A1 | 6/2006 | Hayashi et al. | |
| 2007/0145867 A1 | 6/2007 | Gasser | |
| 2008/0290774 A1 | 11/2008 | Gasser et al. | |
| 2009/0079312 A1 | 3/2009 | Laible | |
| 2010/0027923 A1 | 2/2010 | Bonat | |
| 2010/0194256 A1 | 8/2010 | Grabherr | |
| 2010/0264794 A1 | 10/2010 | Hu et al. | |
| 2011/0001410 A1 | 1/2011 | Chen et al. | |
| 2011/0001412 A1 | 1/2011 | Zimmermann | |
| 2011/0043087 A1 | 2/2011 | Shih et al. | |
| 2011/0067964 A1 | 3/2011 | Krammer et al. | |
| 2011/0101839 A1 | 5/2011 | Boks | |
| 2011/0175508 A1 | 7/2011 | Rechberg et al. | |
| 2011/0176755 A1 | 7/2011 | Chen et al. | |
| 2012/0144622 A1 | 6/2012 | Juan et al. | |
| 2013/0133157 A1 | 5/2013 | Kimura | |
| 2013/0153347 A1* | 6/2013 | Oda | F16F 9/12 |
| | | | 188/290 |
| 2015/0091427 A1 | 4/2015 | Haemmerle et al. | |

FOREIGN PATENT DOCUMENTS

| | | |
|---|---|---|
| CA | 2048153 | 2/1992 |
| CN | 1367326 | 9/2002 |
| DE | 601293 | 7/1934 |
| DE | 654017 | 11/1937 |
| DE | 2911772 A1 | 10/1979 |
| DE | 3431386 A1 | 3/1986 |
| DE | 9012423 U1 | 10/1990 |
| DE | 9311534 U1 | 12/1993 |
| DE | 4325920 A1 | 2/1995 |
| DE | 4427026 A1 | 8/1995 |
| DE | 19615433 | 10/1996 |
| DE | 29620152 | 5/1997 |
| DE | 19634581 A1 | 1/1998 |
| DE | 19717937 | 5/1998 |
| DE | 19938626 | 7/2001 |
| DE | 10214596 | 1/2003 |
| DE | 20116197 | 3/2003 |
| DE | 10213726 | 10/2003 |
| DE | 10210917 | 11/2003 |
| DE | 10313659 | 9/2004 |
| DE | 20308218 U1 | 9/2004 |
| DE | 202005020820 | 9/2006 |
| DE | 102006022563 | 11/2007 |
| DE | 102006051688 | 5/2008 |
| DE | 102009012922 A1 | 9/2009 |
| DE | 202009002035 U1 | 8/2010 |
| DE | 102009012921 A1 | 9/2010 |
| DE | 102011051907 A1 | 1/2013 |
| EP | 0593810 | 9/1994 |
| EP | 0951848 A1 | 10/1999 |
| EP | 1260159 | 11/2002 |
| EP | 1336357 A1 | 8/2003 |
| EP | 1336709 | 8/2003 |
| EP | 1384420 A1 | 1/2004 |
| EP | 1500763 | 1/2005 |
| EP | 1532892 A1 | 5/2005 |
| EP | 1561398 A1 | 8/2005 |
| EP | 2620079 A1 | 7/2013 |
| GB | 1117071 | 6/1968 |
| GB | 2302906 A1 | 2/1997 |
| GB | 2376043 | 12/2002 |
| JP | 59222631 | 12/1984 |
| JP | 01266331 | 10/1989 |
| JP | 04321825 A * | 11/1992 |
| WO | 2008107499 | 9/2008 |
| WO | 2011069175 A1 | 6/2011 |
| WO | 2013110099 A1 | 8/2013 |
| WO | 2013110101 A1 | 8/2013 |
| WO | 2013110102 A1 | 9/2013 |
| WO | 2013138826 A1 | 9/2013 |

* cited by examiner

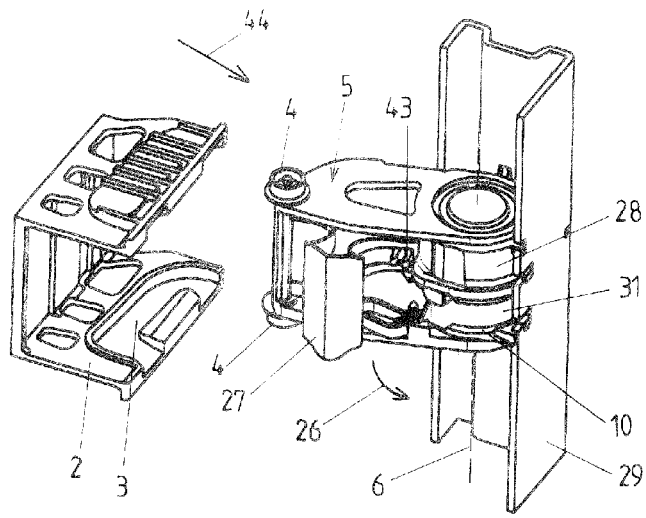
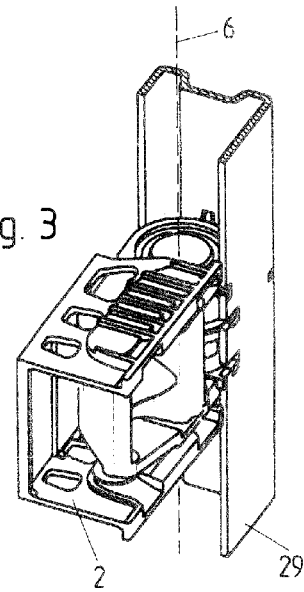
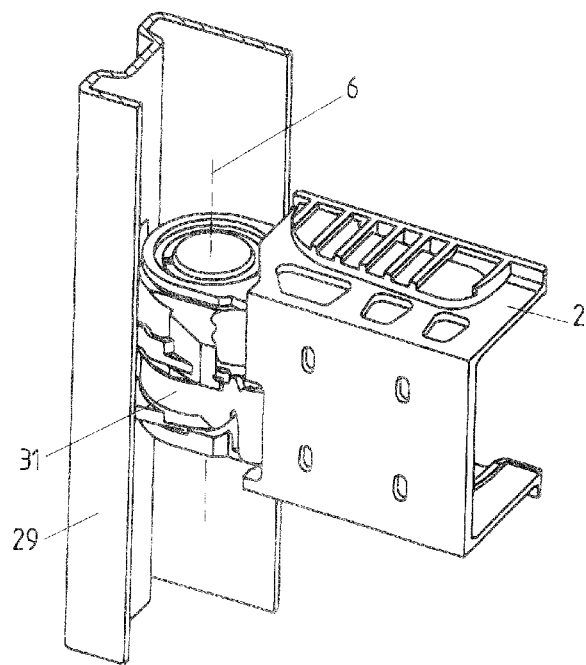

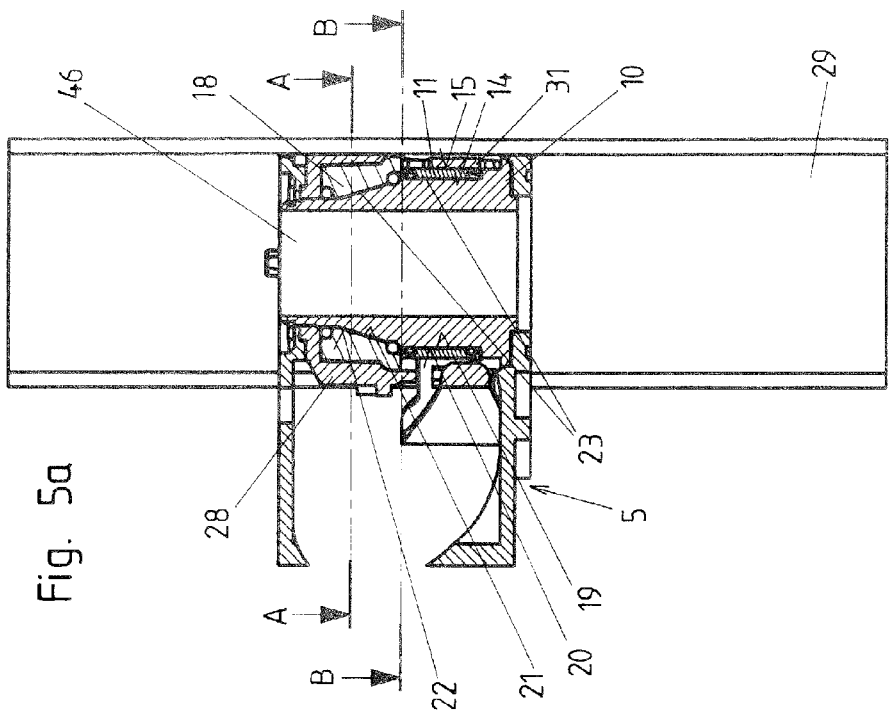
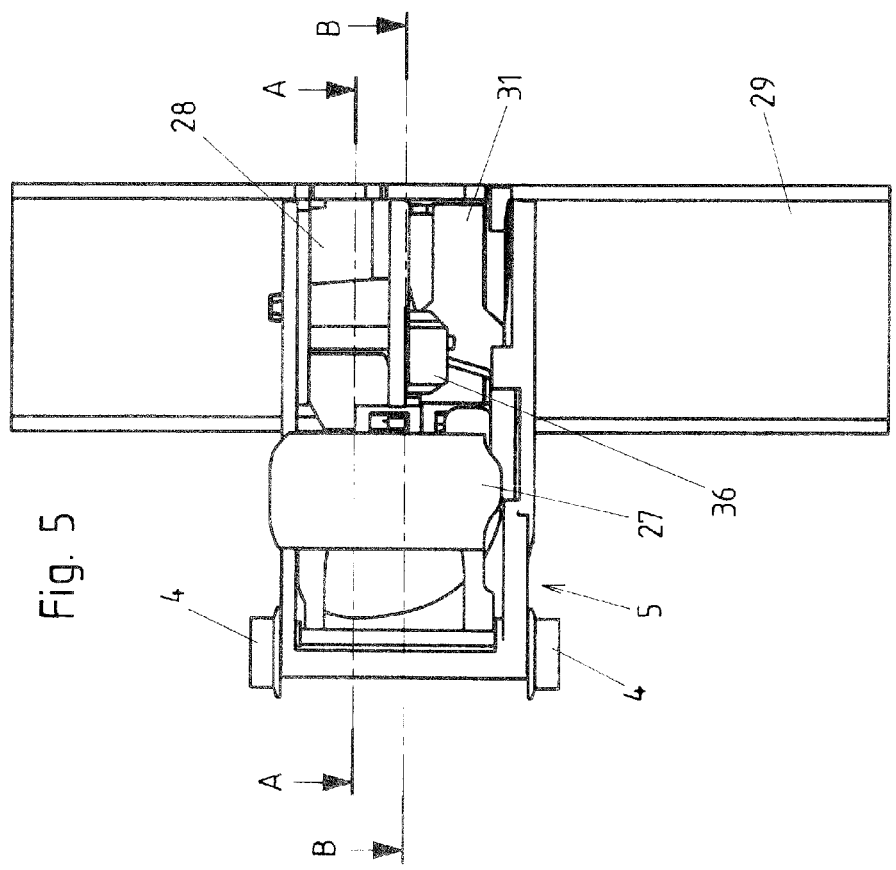

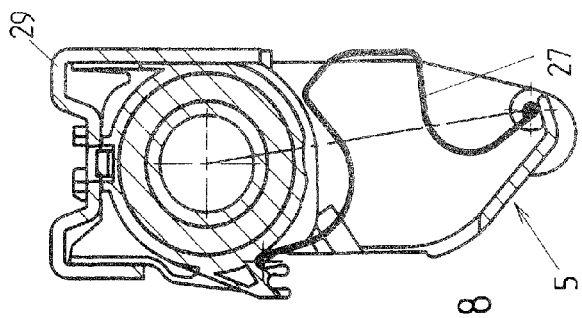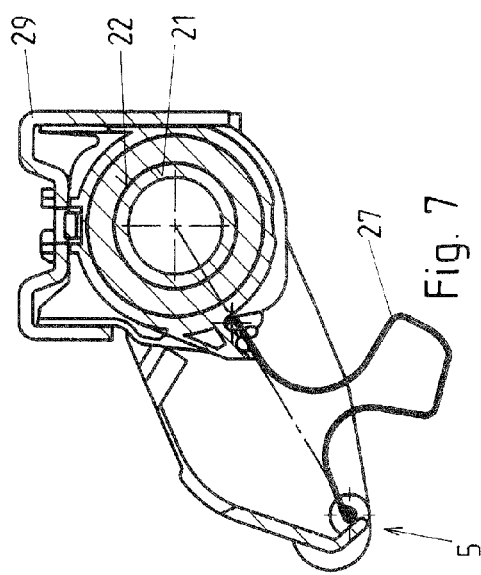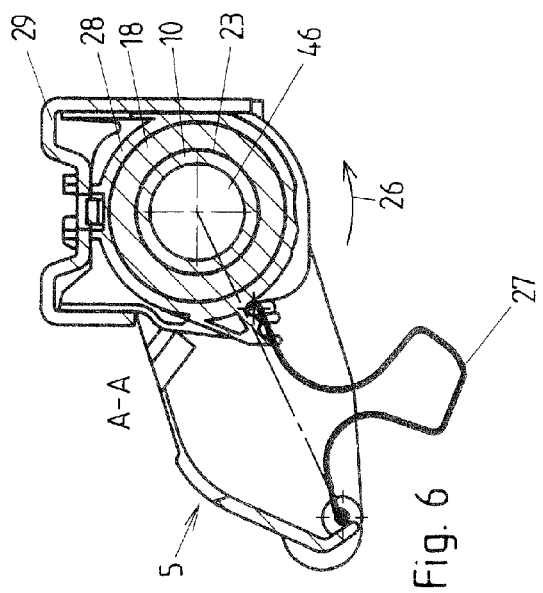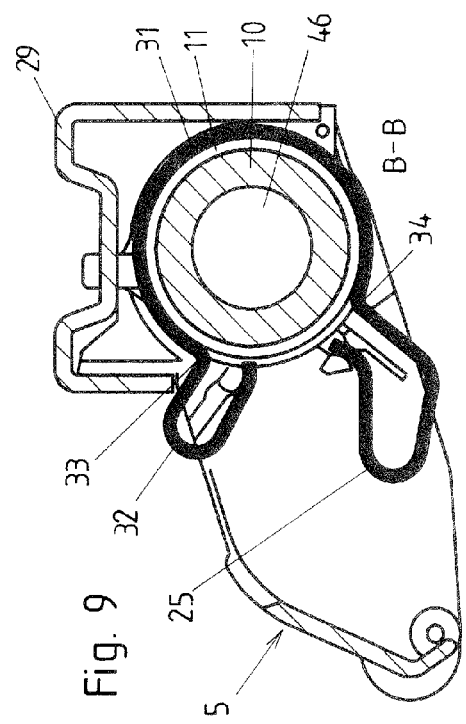

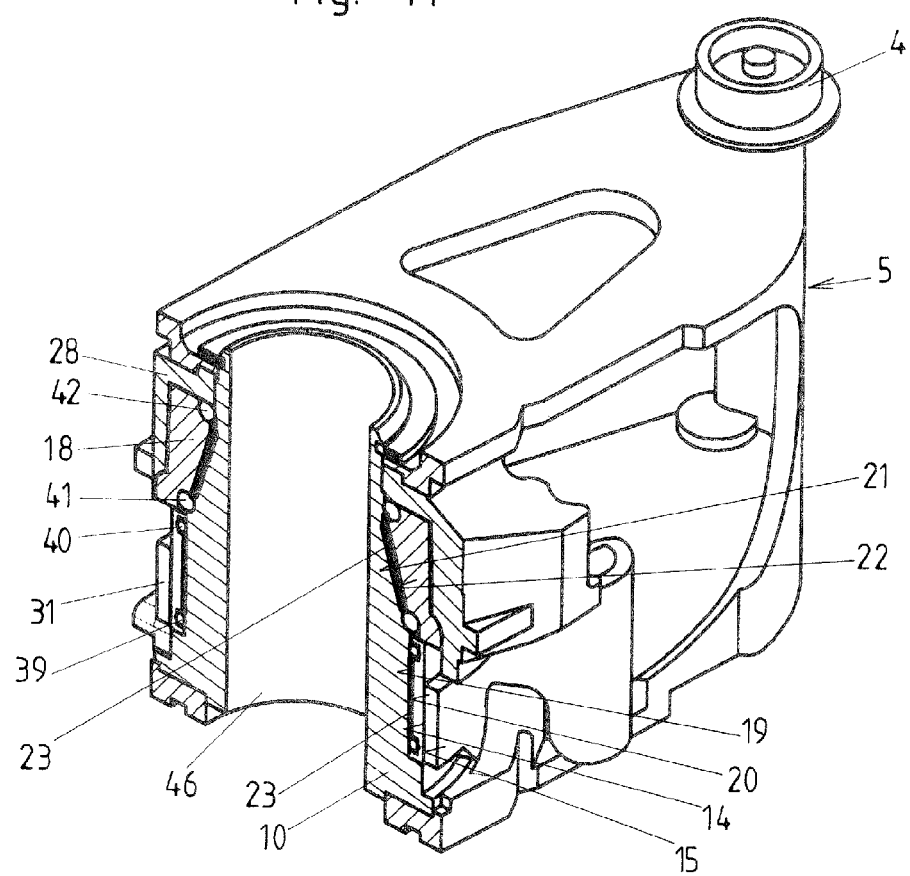

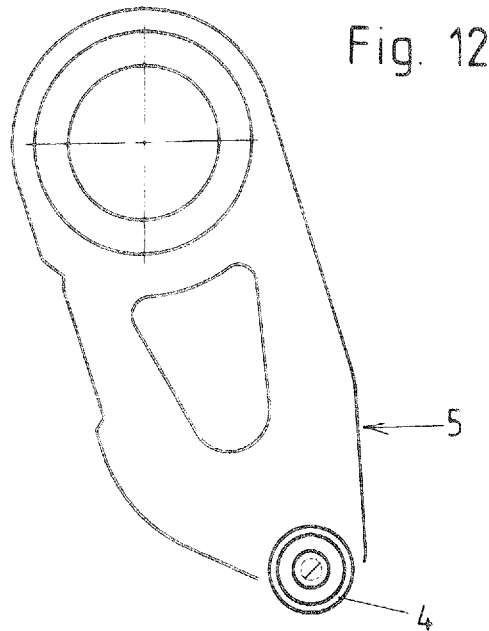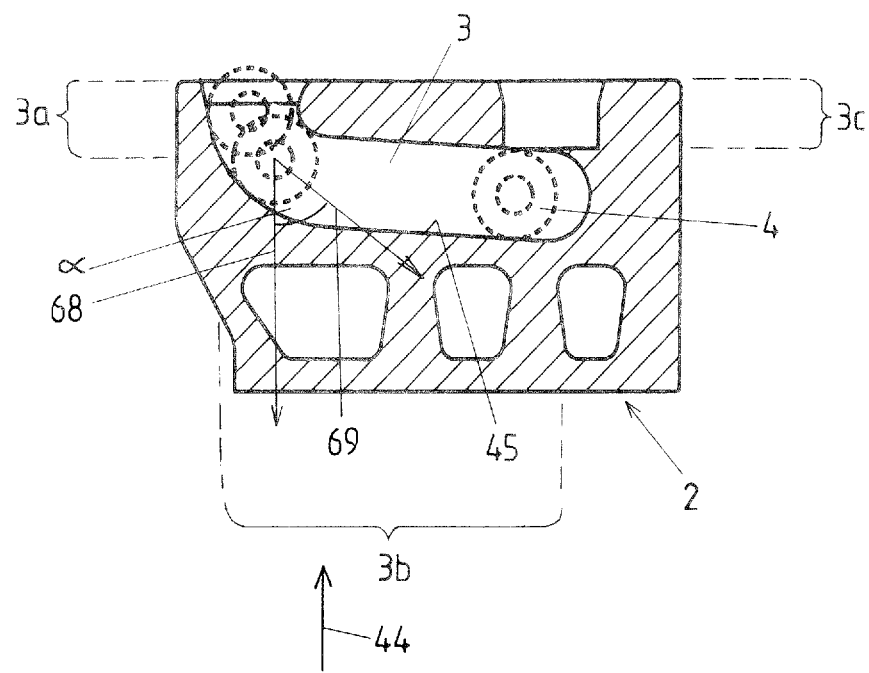

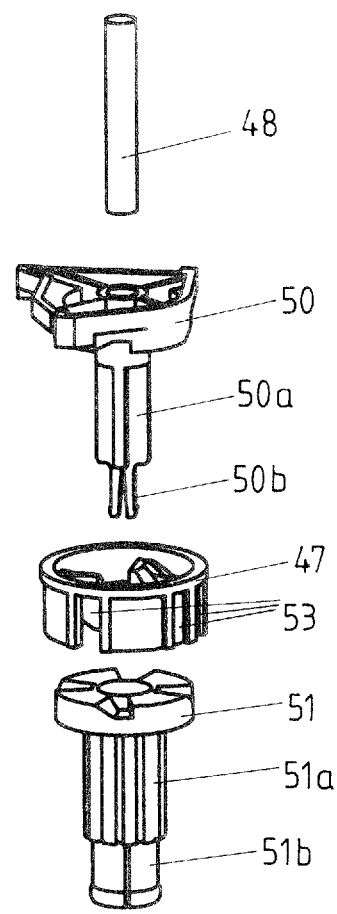
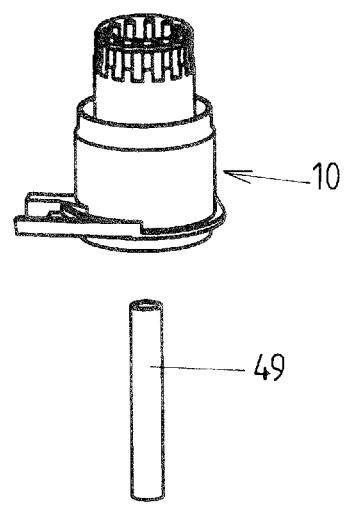
Fig. 14

DEVICE FOR DAMPING THE MOVEMENT OF A MOVABLY MOUNTED COMPONENT

BACKGROUND

The invention relates to a device for damping the movement of a movably mounted component, comprising a braking device which has at least one damper surface which is rotatable about an axis of the braking device, is driven by the movement of the component and, with at least one secured damper surface, encloses at least one gap containing a viscous damping medium which brings about a braking force of the braking device, said braking force braking the rotation of the at least one driven damper surface about the axis of said braking device when the at least one driven damper surface is rotated in relation to the at least one secured damper surface, wherein the braking force exerted by the braking device depends on the rotational speed of the at least one driven damper surface.

Various embodiments of damping devices, such as are used, for example, for damping movably mounted furniture parts, such as drawers, are known. For example, piston-cylinder units, in which at least one throughflow opening is provided in the piston and/or between the piston and the cylinder for a fluid flowing therethrough, for example a hydraulic fluid, are known. Dampers of this type are disclosed, for example, in DE 20 2005 020 820 U1 and DE 10 213 726 A1. Furthermore, rotation dampers, in which a highly viscous damping medium is arranged in a gap between a stationary damper part and a rotatably mounted damper part, are known. The braking force is brought about by said damping medium, which is subject to a shearing load. Dampers of this type are disclosed, for example, in DE 10 210 917 C1, U.S. Pat. No. 5,277,282 A, JP 59222631 A and U.S. Pat. No. 5,143,432 A.

An advantage of said previously known pneumatic, hydraulic and shearing frictional dampers is that the braking force which is brought about depends on the speed of movement of the component to be damped, and therefore a more rapidly moving component is damped to a greater extent, which is desirable in many applications. Disadvantages include the achievable braking forces, which are relatively low with reference to the overall size (in particular in the case of purely pneumatically acting dampers and shearing frictional dampers), the required seals (in particular in the case of hydraulic dampers) and the relatively high frictional forces which have to be overcome at low speeds of actuation of the damper. These are frictional forces which act independently of the braking action of the damper medium (i.e. empty friction).

Furthermore, the use of purely mechanically acting frictional dampers is known. For example, DE 19 938 626 A1, DE 201 16 197 U1 and JP 01266331 A disclose wraparound parts which surround an inner friction part and form a friction pairing therewith. Frictional dampers have the disadvantage that the braking force which they exert is basically independent of speed.

DE 10 313 659 B3, DE 10 214 596 A1, DE 19 717 937 A1, AT 503 877 B1 and EP 1 260 159 A2 disclose piston-cylinder units, in which an air pressure difference formed between the two piston sides acts on an elastically deformable piston part which is pressed to a greater or lesser extent onto the inside of the cylinder depending on the pressure difference. The frictional force acting between the elastic piston part and the inner wall of the cylinder thus depends on the pressure difference and therefore on the speed of the movement of the component to be damped. Linear dampers, in which a mechanically acting braking device is coupled to a pneumatically acting braking device which controls the braking force of the mechanically acting braking device, are therefore provided. Among the disadvantages of said previously known dampers is that first of all a pressure difference has to be built up until the braking force of the frictional damper begins, and this is associated with a time delay of greater or lesser length before the beginning of the damping action. Also, the damping characteristics are disadvantageous for many applications or can only be adapted with difficulty to various applications. A linear damper is also restricted to a limited actuating distance, or the dimensions of a linear damper have to correspond to the desired actuating distance.

A device having two braking devices coupled to each other, which is in the form of a vehicle shock absorber, is disclosed in DE 601 293 C. A wraparound part which is designed to be flexible bears frictionally against a friction drum. One end of the wraparound part is connected to the vehicle axle to be damped. The other end of the wraparound part is connected to a hydraulic damping device. The latter is arranged within the friction drum and comprises wings which are mounted rotatably and are arranged in a chamber which contains a liquid. The liquid can pass from one side to the other side of the wing through holes in the wings. Alternatively, the holes can also be arranged in chamber walls which connect two chambers to each other. The frictional force of the rotatory frictional damper is therefore controlled by the hydraulic damper, and therefore, as a result, a totally speed-dependent braking characteristic is achieved. A disadvantage with this device is that the device has a relatively large overall size. Also, there have to be high-quality seals because of the high pressures occurring in the liquid. Seals of this type also cause friction, and therefore smooth running at low speeds of movement is limited (i.e. there is increased empty friction).

As mentioned, damping devices are frequently used for damping the entry movement of pull-out furniture parts, such as drawers and pull-out tall cabinets. Said pull-out furniture parts are then customarily also equipped with a self-retracting device. The latter retracts the pull-out furniture part over a final section of the entry distance into the closed state of said furniture part, with the entry movement being damped by the damping device. Various embodiments of self-retracting devices have been disclosed. A conventional embodiment provides a spring-actuated tilting slide which interacts with a driver fitted on the pull-out furniture part and is adjusted by the driver between a basic position and a waiting position, which is taken up by the tilting slide in the pulled-out state of the pull-out furniture part. An example of such a self-retracting device, here in combination with a pull-out blocking device, is disclosed in EP 1 500 763 A2. GB 1 117 071 discloses a keeping-closed device, in which a spring-loaded catch arm is mounted pivotably about an axis and is pivoted between the basic position and the waiting position about said axis by the driver. The spring is moved here over a dead center.

If there are a plurality of pull-out furniture parts which are intended to be able to be pulled out only in an alternating manner, for example a plurality of drawers arranged one above another, pull-out blocking devices are used. A central locking can also be implemented via such pull-out blocking devices. In a frequent embodiment, there are blocking rods which have only a limited clearance for their displacement. An actuating part which interacts with at least one of the blocking rods is provided for each pull-out furniture part. When one of the pull-out furniture parts is pulled out, at least one of the blocking rods is displaced, and therefore the clearance is used up for the displacement of the blocking rods, and a further pull-out furniture part thus cannot be pulled out simultaneously. A pull-out blocking device of this type is disclosed, for example, in EP 1 500 763 A2, which has already been mentioned. GB 2 376 043 A discloses a pull-out blocking device in which the actuating parts are pivoted about axes, which lie parallel to the longitudinal extent of the blocking rods, and have cams interacting with the blocking rods.

Various further embodiments of pull-out blocking devices with blocking rods are known. For example, DE 29 620 152 U1, EP 1 336 709 A1 and WO 2008/107499 A1 show an actuation of the blocking rods by actuating parts which are pivoted about an axis at right angles to the blocking rods when the respective pull-out furniture part is pulled out. For example, GB 2 376 043 A discloses a pull-out blocking device in which the actuating parts are pivoted about axes, which lie parallel to the longitudinal extent of the blocking rods, and have cams interacting with the blocking rods.

SUMMARY

It is an object of the invention to provide a damping device of the type mentioned at the beginning which has a speed-dependent braking force, wherein a compact design of the device is made possible and the device friction to be overcome at low speeds of movement of the component to be damped is intended to be kept small. This is achieved by a device with one or more features of the invention.

In the case of the device according to the invention, in addition to the braking device, in which a braking force can be exerted by a viscous damping medium, arranged in at least one gap, there is an additional braking device by which a braking force can likewise be exerted. In addition, the device comprises a coupling for coupling up and decoupling the additional braking device. In the closed state of the coupling, at least one additional damper surface of the additional braking device, which additional damper surface is rotatable about an axis of the additional braking device, is driven about the axis of the additional braking device by the movement of the component. In the process, the additional braking device exerts an additional braking force. In the open state of the coupling, the at least one additional damper surface is decoupled from the movement of the component, i.e. is not driven, and the additional braking device is inactive, i.e. does not exert a braking force on the component. The coupling is closed and opened as a function of the rotational speed of the at least one driven damper surface of the braking device about the axis of the braking device, with the coupling being automatically actuated by the braking force exerted by the braking device. In an advantageous manner, the coupling is open in the event of a rotational speed of the at least one driven damper surface, which rotational speed is below a threshold value, and is closed in the event of a rotational speed of the at least one driven damper surface, which rotational speed is above the threshold value. The rotational speed of the at least one driven damper surface depends on the speed or rotational speed of the movement of the movably mounted component, and therefore the additional braking device is thus switched on at higher movement speeds of the component. It is thus possible, at higher speeds, to increase the braking force which is exerted as a whole by the device and which exceeds the speed-dependent increase in the braking force exerted by the braking device.

By means of the invention, a compact, cost-effective damper with advantageous braking characteristics can be provided, wherein the level of the braking force depends on the speed of the component to be damped. Reduced empty friction can be achieved. Since the braking device and additional braking device are in the form of rotational dampers, damping over a basically unlimited path can optionally be achieved.

If the braking device comprises more than one driven damper surface, said damper surfaces are preferably all rotatable about the same axis (i.e. coaxial). If the additional braking device comprises more than one driven additional damper surface, said additional damper surfaces are preferably all rotatable about the same axis (i.e. are coaxial).

The axis of the braking device, about which the at least one driven damper surface of the braking device is rotatable, advantageously coincides with the axis of the additional braking device (i.e. corresponds thereto), about which the at least one driven additional damper surface of the additional braking device is rotatable at least in the closed state of the coupling, i.e. the at least one driven damper surface of the braking device and the at least one driven additional damper surface of the additional braking device are therefore rotatable about the same axis or are coaxial. A simple, compact design is thereby achieved.

In an advantageous embodiment of the invention, the at least one driven additional damper surface of the additional braking device, with the at least one secured additional damper surface, encloses at least one gap containing a viscous damping medium which brings about a braking force of the additional braking device, which braking force brakes the rotation of the at least one driven additional damper surface about the axis of said additional braking device, when the at least one driven additional damper surface is rotated in relation to the at least one secured additional damper surface. The braking force of the additional braking device therefore depends on the rotational speed of the at least one driven additional damper surface.

In another possible embodiment, the additional braking device could also be designed purely mechanically and could have at least one friction pairing, in which, in order to generate a braking force, a driven friction surface is rotatable in relation to a secured friction surface, which bears thereon, about an axis of the additional braking device. In an advantageous manner, a speed dependency of the braking force exerted by the additional braking device could be brought about by the fact that the friction surfaces of at least one of the friction pairings are pressed against each other to a greater or lesser extent as a function of the braking force exerted by the braking device, i.e. as a function of the speed of movement of the component. One advantage of such a mechanically acting braking device is provided in that it is possible to achieve a high friction force in the case of a compact construction.

In contrast, when the additional braking device is formed with a viscous damping medium, which is arranged in at least one gap and brings about a braking force, there are advantages in that the wear which occurs during mechanical braking due to friction is omitted and that operating noises which may occur during mechanical braking (such as rattling or squeaking) can be avoided. In addition, the braking force of such an additional braking device is speed-dependent.

A combination of a mechanically acting braking device with a braking device having a damping medium, which is arranged in a gap and is subject to a shearing load, could in principle also be provided.

The viscosity of the viscous damping medium arranged in the at least one gap of the braking device and optionally in the at least one gap of the additional braking device is advantageously more than 20 000 Pa·s, preferably more than 50 000 Pa·s, wherein values in the range of 100 000 to 1 000 000 Pa·s are particularly preferred.

The gap width of the gap, or of at least one of the gaps, preferably all of the gaps in which the damping medium of the braking device and optionally of the additional braking device is arranged, is advantageously in the range of 0.1 mm to 0.5 mm, i.e. the damping medium has such a layer thickness.

The damping force is brought about by the damping medium which is arranged in the at least one gap of the braking device and optionally in the at least one gap of the additional braking device and advantageously completely fills the gap or respective gap, by the fact that said damping medium is subject to a shearing load. The gap or said gaps having the damping medium preferably extend annularly around the axis of the braking device.

In order to retain the damping medium in the gap or in the respective gap of the braking device and optionally of the additional braking device, it is possible to use seals of relatively simple design, if any at all. In the case of non-flowable grease, seals can optionally be entirely omitted. In the case of flowable oils, seals which prevent the oil from running out are required, wherein high pressures do not act on the seals.

In an advantageous embodiment of the invention, the coupling comprises a wraparound part which is designed to be flexible, preferably to be elastically bendable. The wraparound part surrounds a coupling-up part over a part of the circumference thereof that amounts to at least more than 90°, preferably at least 180°, particularly preferably at least 250°. The wraparound part preferably extends around the coupling-up part over at most 500°, particularly preferably over less than 360°. The wraparound part is connected directly or indirectly to a damper sleeve of the braking device, which damper sleeve has at least one of the damper surfaces of the braking device.

In the event of a rotational speed of the at least one driven damper surface of the braking device, which rotational speed lies above the threshold value, the wraparound part is connected to the coupling-up part for rotation therewith, whereas, in the case of a rotational speed of the at least one driven damper surface of the braking device, which rotational speed is below the threshold value, the two parts are rotatable in relation to each other.

In an advantageous manner, the axis about which the wraparound part and the coupling-up part are rotatable in relation to each other in the open state of the coupling coincides with the axis of the braking device and/or with the axis of the additional braking device.

The connection between the wraparound part and the coupling-up part for rotation therewith in the closed state of the coupling can be realized by means of a frictional connection and/or interlocking connection.

For the automatic closing and opening of the coupling, a rear end of the wraparound part is advantageously connected directly or indirectly to the damper sleeve which transmits a braking force, which is brought about by the braking device, to the wraparound part, wherein the damper sleeve surrounds an inner braking part, and the damper sleeve and the inner braking part are rotatable in relation to each other. The term "rear end" refers to the relative movement between the wraparound part and the inner braking part or between the wraparound part and the coupling-up part in the open state of the coupling. In this case, either the wraparound part can be driven by the component to be damped and can rotate in one direction of rotation in relation to the stationary, inner braking part or to the coupling-up part which is stationary in the open state of the coupling, or the inner braking part can be driven and can rotate in an opposed direction of rotation in relation to the wraparound part, wherein, in the open state of the coupling, the coupling-up part rotates together with the inner braking part.

A device according to the invention is suitable for damping different types of movably mounted components, in other words for exerting a braking force on different types of movably mounted components. The movement of a linearly movably mounted component, for example of a linearly movably mounted furniture part, such as a drawer or a pull-out cabinet unit, or the movement of a rotatably mounted component, for example a door or a flap in the form of a furniture part or as a part in or on a vehicle, can thus be damped. Other different types of linearly or rotatably movably mounted parts, such as machine parts, can likewise be damped by a device according to the invention.

Through the use of a device according to the invention, in which at least one additional braking device is switched on in a cascade-like manner as a function of the braking force exerted by the braking device, high damping forces can be applied, and therefore the device can be used, for example, for damping the pushing-in movement of heavy-load pull-out mechanisms. In the case of heavy-load pull-out mechanisms, pull-out furniture parts, of which one, more than one or all are loadable with more than 150 kg, are provided.

BRIEF DESCRIPTION OF THE DRAWINGS

Further advantages and details of the invention are explained below with reference to the attached drawing, in which:

FIG. 2 shows a perspective view of one of the devices from FIG. 1, in the catch-arm waiting position, which is taken up in the pulled-out state of the pull-out furniture part, with a fastening rail;

FIG. 3 shows a perspective view corresponding to FIG. 2 in the state which is present in the retracted state of the pull-out furniture part;

FIG. 4 shows a perspective view corresponding to FIG. 3, but from a different viewing angle;

FIG. 5 shows a view of the device fastened to the rail, with the catch arm in the waiting position;

FIG. 5a shows an illustration corresponding to FIG. 5, but in the longitudinal center section of the device;

FIG. 6 shows a section along the line A-A from FIGS. 5 and 5a;

FIGS. 7 and 8 show sections corresponding to FIG. 6, but in an intermediate position and in the catch-arm main position, which is taken up in the refracted state of the pull-out furniture part;

FIG. 9 shows a section along the line B-B of FIGS. 5 and 5a;

FIG. 11 shows a perspective view of the device which is cut open in a section running parallel to the axis and through the axis;

FIG. 12 shows an illustration in order to explain the retraction movement of the catch arm of the device into the slotted guide of the driver;

FIG. 14 shows an exploded illustration of the blocking rods with the cam follower parts fitted thereon and with the actuating part, which is located in between, of said modified embodiment.

DETAILED DESCRIPTION OF THE PREFERRED EMBODIMENTS

Figure 1:
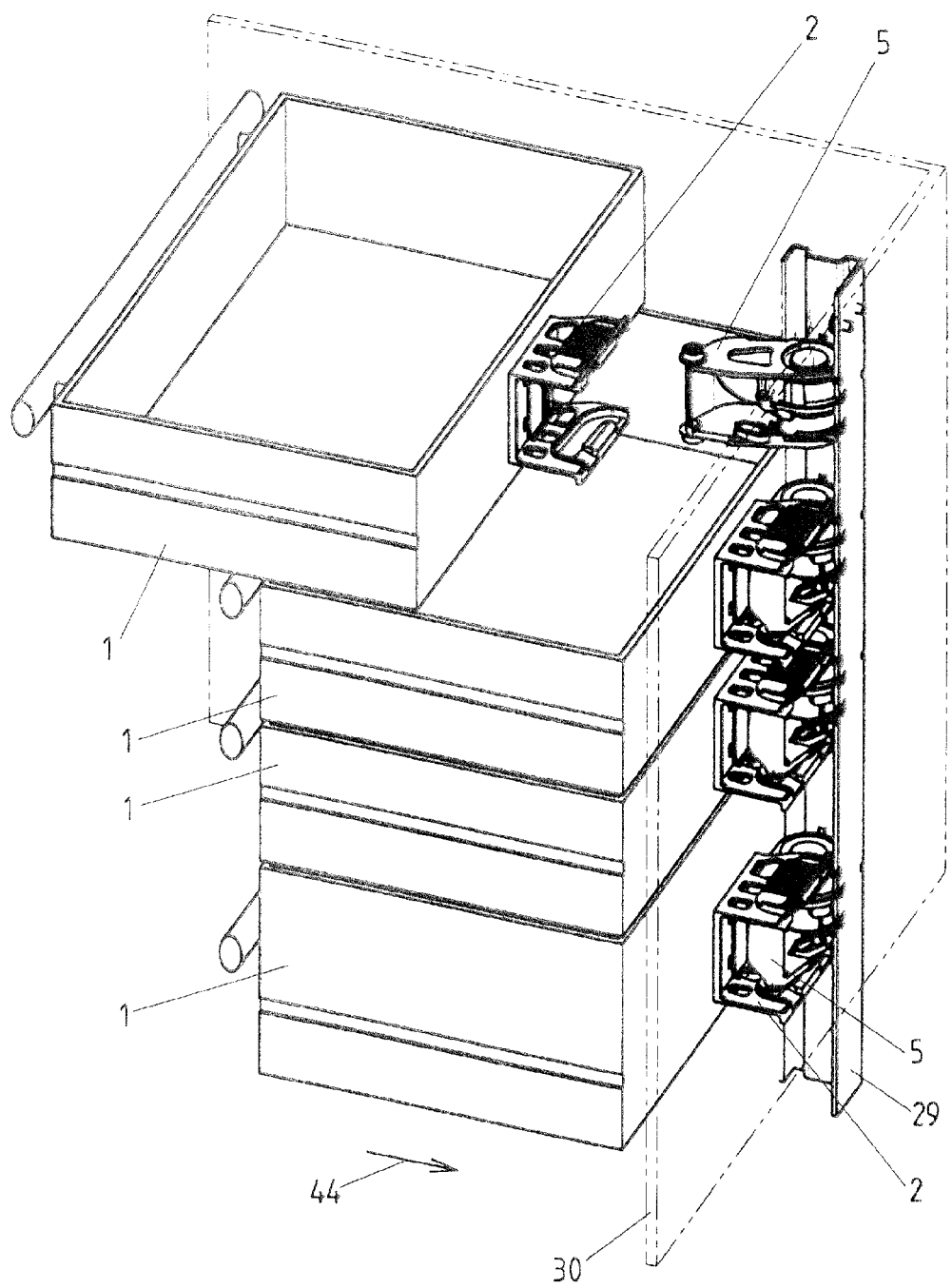
FIG. 1 shows a perspective view of devices according to the invention according to an advantageous embodiment in a use for damping the pushing-in movement of pull-out furniture parts.

A first embodiment of a device according to the invention is illustrated in FIGS. 1 to 12. The device is used here for damping the pushing-in movement of movably mounted components 1 which are formed by drawers, wherein the pull-out guides for the drawers are not illustrated. The device can also be used in an analogous manner for damping the pushing-in movement of other pull-out furniture parts.

A retracting spring 27 is integrated here in the device in order, in addition to the damping, to provide an automatic refraction mechanism for the pull-out furniture part over the final part of the entry path. A retracting spring could in principle also be omitted.

A driver 2 which has slotted guide tracks 3 which, as illustrated, can be formed by depressions or else by passage openings is fitted on the rear side of a respective component 1 to be damped. A catch arm 5 of the device has projections 4 which are formed here by rollers and interact with the slotted guide tracks 3. A U-shaped design of the driver 2 with opposite slotted guide tracks 3, which each interact with a projection 4, is preferred, wherein an individual slotted guide track 3 interacting with a projection 4 could also be provided. A design the other way around, in which at least one slotted guide track is provided on the catch arm and at least one projection is provided on the driver, is also possible. The at least one projection 4 could also be designed in the form of a pin.

In the pushed-in state of the pull-out furniture part (cf. the three lower drawers in FIG. 1, and FIGS. 3, 4 and 8), the catch arm 5 takes up the main position thereof. When the pull-out furniture part is pulled out in the pull-out direction 68, the catch arm 5 is pivoted about the axis 6 until said catch arm takes up the waiting position thereof (cf. the upper drawer in FIG. 1, and FIGS. 2, 5, 6 and 9). In this position of the catch arm 5, the driver 2 decouples from the catch arm 5. When the pull-out furniture part is pushed in (movement in the direction of the arrow 44), the driver 2 couples up to the catch arm 5, which is in the waiting position thereof, whereupon the catch arm 5 rotates back about the axis 6 until the catch arm takes up the main position again and the pull-out furniture part is completely pushed in.

Other designs of the driver 2 and of the catch arm 5, in order to permit such a coupling-up and decoupling with the pivoting of the catch arm between the main position thereof and the waiting position thereof, are also possible. For example, a recess which is of substantially V-shaped design and in which a projection enters in order to adjust the catch arm between the waiting position thereof and the main position thereof and back by the driver 2 could be provided. Different types of possible carry-along connections are known, for example, from conventional pull-out furniture parts with automatic retraction mechanisms.

In the coupled state of the catch arm 5 to the driver 2, there is an interlocking connection between said two parts in the direction of movement 44 and the opposed pull-out direction.

The inner braking part 10 and a housing part 28 which is placed onto the latter are connected in a rotationally fixed manner to the mounting rail 29 which, for its part, is fastened to the furniture body 30. The fastening to the mounting rail 29 preferably takes place by means of latching projections of the inner braking part 10 and of the housing part 28, which engage in recesses in the mounting rail 29. A fastening of the device directly to the furniture body 30 is also conceivable and possible.

Figure 10:
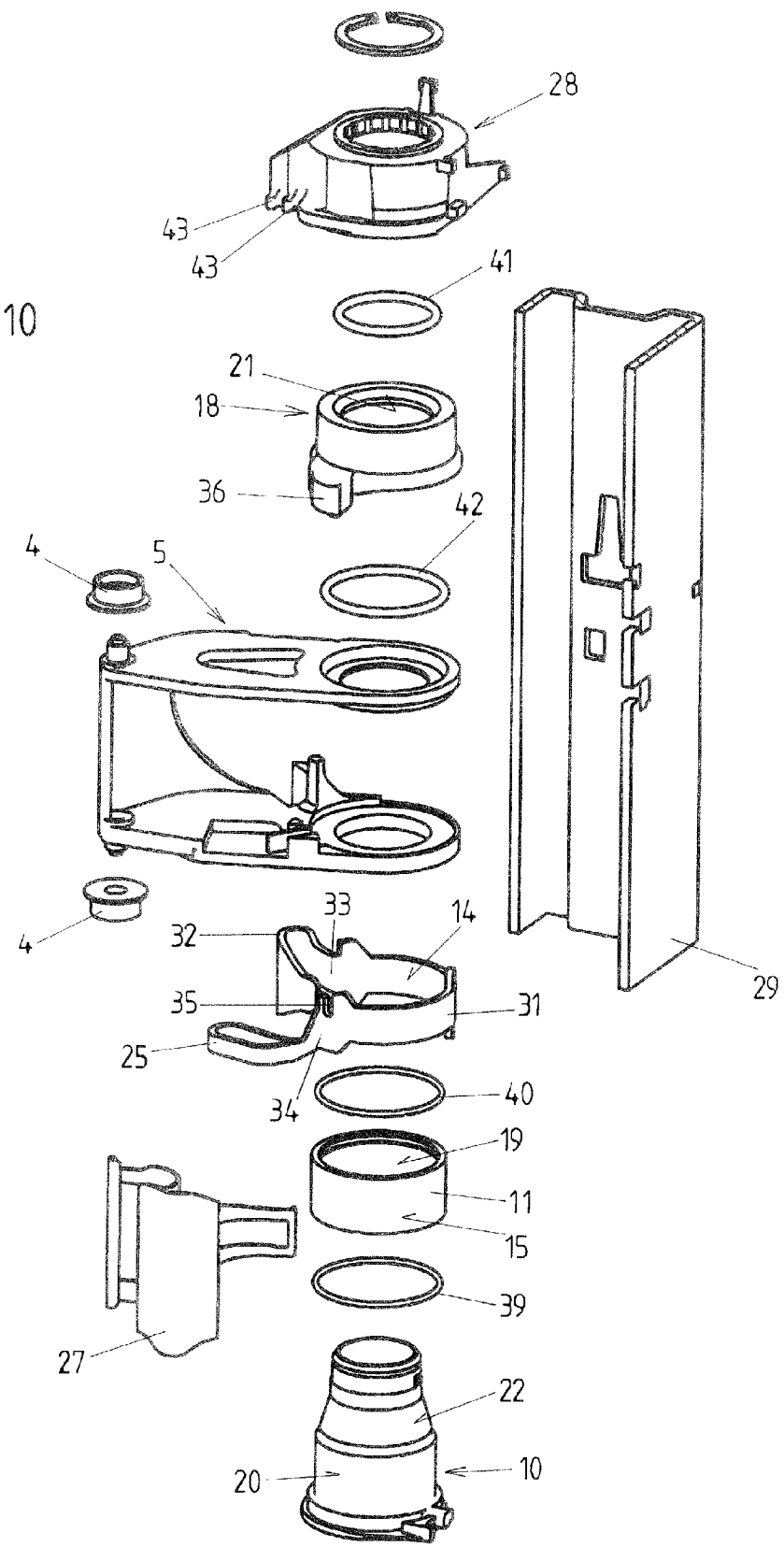
FIG. 10 shows an exploded illustration.

The unit formed by the inner braking part 10 and by the housing part 28 preferably has an inner cavity passing completely axially through said unit (cf. FIG. 10). This cavity can receive parts of a pull-out blocking device, as described further below with reference to FIGS. 13 and 14.

The catch arm 5 is mounted rotatably about the axis 6 on the unit formed by the inner braking part 10 and the housing part 28.

The catch arm 5 is connected to a wraparound part 31 which is pre-shaped, but is flexible because of the elasticity thereof, and therefore, when the catch arm 5 rotates about the axis 6 in the direction of the arrow 26, the wraparound part 31 is likewise rotated about the axis 6. In the exemplary embodiment, the wraparound part 31 is formed by a band and runs over a large part of the circumference of the inner braking part 10, or of a coupling-up part 11 arranged thereon, around the inner braking part 10, or around the coupling-up part 11. The wraparound part 31 and the coupling-up part 11 form parts of a coupling, the function of which is described further below. The inner surface (i.e. facing the axis 6) of the wraparound part 31 forms a first coupling surface 14 which, in the closed state of the coupling, interacts with the outer surface (i.e. directed away from the axis 6) of the coupling part 11, which surface forms a second coupling surface 15.

The catch arm 5 is connected to the wraparound part 31 via an overload spring 32, the function of which is explained further below. In the exemplary embodiment shown, the overload spring 32 is formed integrally with the wraparound part 31 and is formed by a section, which has a curved or loop-shaped profile, of the band forming both the wraparound part 31 and the overload spring 32. The geometry of said curved or loop-shaped profile and the elasticity of this section of the band are configured in such a manner that a spring element having the desired spring characteristic is produced. In modified embodiments, the overload spring 32 can also be formed by a separate part which is arranged in the transmission path between the catch arm 5 and the at least one driven additional damper surface 19 of the additional braking device. Instead or in addition, an overload spring could also be arranged at a different point in the transmission path of the force which is transmitted from the component to be damped to the device and drives the device, for example also between the inner braking part 10 and the mounting rail 29. In other embodiments, an overload spring can also be omitted.

The transition between the wraparound part 31 and the overload spring 32 can be considered to be a front connecting point 33 of the wraparound part 31, at which connecting point the movement, which is to be damped, of the component 1 is introduced into the wraparound part 31.

The wraparound part 31 is connected to a damper sleeve 18 at a rear connecting point 34. In this case, in the exemplary embodiment shown, an axial projection of the wraparound part 31, which projection has a slot 35, is pushed into a recess in the region of that side of a radial projection 36 of the damper sleeve 18 which is at the bottom in FIG. 10, wherein the slot 35 engages in a web arranged in said recess (the recess of the radial projection 36 and the web arranged therein are not visible in FIG. 10).

Between the front connecting point 33 and the rear connecting point 34, the wraparound part 31 extends around the coupling-up part 11 over more than 90°, preferably over more than 180°, particularly preferably over more than 250°, in a first direction of rotation (opposed to the arrow 26). In the exemplary embodiment shown, this extension is less than 360°. An extension by more than 360° is possible, i.e. the wraparound part then has more than one complete turn, said wraparound part running helically around the coupling-up part 11.

The rear connecting point 34 of the wraparound part 31 is connected to the catch arm 5 via a holding-open spring 25. In this exemplary embodiment, said holding-open spring 25 is formed integrally with the wraparound part 31 and is formed by a section, which has a curved or loop-shaped profile, of the band which also forms the wraparound part 31 and optionally the overload spring 32. The geometry of the curved or loop-shaped profile and the elasticity of said section of the band are matched to a desired spring characteristic. The function of the holding-open spring 25, which, during the damping of the movement of the component 1, acts upon the rear connecting point of the wraparound part in relation to the front connecting point of the wraparound part in the direction of rotation 26 (this is the opposed direction of rotation in which the wraparound part extends around the axis 6 from the front connecting point to the rear connecting point), is described further below.

The holding-open spring 25 could also be formed by a separate part or could optionally also be omitted.

The overload spring 32 is substantially harder, preferably more than 10 times harder, than the holding-open spring 25.

The damper sleeve 18 surrounds a section of the inner braking part 10. That surface of the damper sleeve 18 which is opposite the inner braking part 10 forms a driven damper surface 21. The outer surface of the inner braking part 10, which surface is opposite the damper sleeve 18, forms a secured damper surface 22. Between the driven damper surface 21 and the secured damper surface 22 there is an annular gap in which a viscous damping medium 23 is arranged. Sealing rings 41, 42 bound the gap at both of the ends thereof, and therefore a sealed space is formed. A flowable oil can therefore be used as the damping medium. However, the use of a non-flowable grease is likewise possible. In principle, the sealing rings 41, 42 could then also be omitted.

The braking device therefore comprises the damper sleeve 18, the inner braking part 10 and the damping medium 23.

The annular coupling-up part 11 surrounds a section of the inner braking part 10. In the closed state of the coupling, the inner surface of the coupling-up part 11, which surface is opposite the inner braking part 10, forms a driven additional damper surface 19. The outer surface of the inner braking part 10, which surface is opposite the coupling-up part 11, forms a secured additional damper surface 20. Between the driven additional damper surface 19 and the secured additional damper surface 20 there is an annular gap in which a viscous damping medium 23 is arranged. Sealing rings 39, 40 bound the gap at both ends, and therefore a sealed space is formed. A flowable oil can therefore be used as the damping medium. However, the use of a non-flowable grease is likewise possible. The sealing rings 39, 40 could then also be omitted.

The additional braking device therefore comprises the coupling-up part 11, the inner braking part 10 and the damping medium 23.

By rotation of the catch arm 5 about the axis 6 in the direction of rotation corresponding to the arrow 26, the wraparound part 31 is rotated about the axis 6, as a result of which, by means of the connection of the wraparound part 31 to the damper sleeve 18, the latter is rotated about the axis 6. The axis 6 forms both the axis of rotation of the braking device and the axis of rotation of the additional braking device. Depending on the speed of rotation of the damper sleeve 18 about the axis 6, the braking device exerts a braking force of greater or lesser size, as a result of which a tensile force of greater or lesser size acts between the front connecting point 33 and the rear connecting point 34 of the wraparound part 31.

In the rest state of the device, the first coupling surface 14 of the wraparound part 31 is at a distance, at least in sections, from the second coupling surface 15 of the coupling-up part 11. In the rest state, the wraparound part 31, owing to the pre-shaping thereof, is preferably at a distance from the coupling surface 15 of the inner braking part 10 over at least substantially the entire profile of the coupling surface 14 thereof, i.e. at least over 90% of the extent thereof in the circumferential direction.

By means of the elasticity of the wraparound part 31 and/or by means of the preferably present holding-open spring 25, the coupling surface 14 of the wraparound part 31 is then spaced apart (at least in sections) from the coupling surface 15 of the inner braking part 10 up to a threshold value of the speed of the component 1 or a threshold value of the rotational speed of the catch arm 5, and the coupling is opened, i.e. the rotational movement of the wraparound part 31 is not transmitted to the coupling-up part 11. The additional braking device is therefore inactive, i.e. does not exert any braking force.

Only when the threshold value is exceeded is the coupling closed by the braking force exerted by the braking device by the wraparound part 31 being placed onto the coupling-up part 11 in such a manner that a carry-along connection is formed, i.e., when the wraparound part 31 rotates about the axis 6, the coupling-up part 11 is likewise rotated about the axis 6 by the wraparound part 31. In the exemplary embodiment, the carry-along connection is of frictional design. Elements acting in an interlocking manner could be provided instead or in addition. In the closed state of the coupling, the additional braking device is active, i.e. exerts a braking force. In the exemplary embodiment, in which the additional braking device has the viscous damping medium 23 arranged in the at least one gap, the braking force exerted by the additional braking device is speed-dependent.

In order, when the additional braking device is switched on by closing the coupling, to achieve an appropriate increase in the overall braking force, the braking force exerted by the additional braking device advantageously amounts to at least a third of the braking force which is exerted by the braking device; the braking force exerted by the additional braking device is preferably greater than the braking force exerted by the braking device, particularly preferably more than twice the size.

Desired values can be achieved for the sizes of the braking force of the braking device and the braking force of the additional braking device by corresponding lengths and/or widths being selected for the gaps filled with the damping medium, and/or by damping media of different viscosities being used.

At a high speed, with which the component 1 strikes against the catch arm 5, without the overload spring 32 a suddenly occurring, high braking force of the device would occur, as a result of which undesirably high loadings and an undesirably severe braking of the component 1 would be the consequence. The peak of the braking force is cushioned by the overload spring 32 by the catch arm 5 being able to rotate in relation to the wraparound part 31, with the overload spring 32 being deformed.

In the exemplary embodiment illustrated, as already mentioned, there is furthermore a retracting spring 27, which could also be omitted if only the damping function is desired. The retracting spring 27 runs between the catch arm 5 and the unit formed by the housing part 28 and the inner braking part 10. In particular, latching arms 43 between which the inner end (i.e. located closer to the axis 6) of the retracting spring 27 can be latched are arranged on the housing part 28.

During the pivoting of the catch arm 5 from the main position thereof in the direction of the waiting position thereof, the retracting spring 27 is first of all tensioned, cf. FIG. 8 and FIG. 7. Shortly before the waiting position is reached, a dead center is crossed (this is the position illustrated in FIG. 7), and, as a consequence, the retracting spring is again relaxed a little (by preferably less than one fifth of the preceding compression stroke) until the waiting position illustrated in FIG. 6 is reached.

When the driver 2 runs up against the catch arm 5 while the pull-out furniture part is being pushed in, said two parts couple to each other and the driver 2 pivots the catch arm 5 over the dead center thereof. As a result, the pull-out furniture part is retracted by the catch arm 5 by means of the force of the retracting spring 27 until the main position of the catch arm illustrated in FIG. 8 is reached. The further pivoting is limited in the waiting position and in the main position by corresponding stops (in the main position, this can also be achieved by a stop for the pushing-in movement of the pull-out furniture part).

The pull-out furniture part is retracted here counter to the braking force exerted by the device. Since the retraction speed, optionally after damping of the initially more rapid speed on running up against the catch arm, is relatively low, and therefore the coupling is open, only the braking force of the braking device has to be overcome here, while the additional braking device is inactive. The force of the retracting spring 27 can therefore be configured to be relatively low, which makes it easier to pull out the pull-out furniture part.

If the retracting spring 27 can be connected to the housing part 28 at different distances from the axis 6, by, for example, a plurality of latching arms 43 being provided, the strength of the retracting force can be changed by different pretensions of the retracting spring 27. Connecting possibilities to different points of the catch arm 5 can also be provided, or a continuous change in the distance from the axis, for example by means of an eccentric element, can be provided.

In the exemplary embodiment, a curved leaf spring is provided as the retracting spring. Retracting springs designed in a different manner can also be provided. For example, use could be made of a leg spring, of which one leg is connected to the catch arm 5 and the other leg is connected to the housing part 28. It would also be possible, for example, to provide a curved leaf spring which optionally has a greater width in a central region than in the end-side connecting regions and can also run, for example, upward or downward in a curved manner.

The entry of one of the projections 4 of the retracting lever 5 into the associated slotted guide track 3 of the driver 2 when the component 1 is displaced in the direction of movement 44 is illustrated in FIG. 12. The slotted guide track 3 running in a curved manner (the two slotted guide tracks 3 have an identical profile) has an entry section 3a, at the beginning of which the projection 4 moves from outside the slotted guide track 3 into the slotted guide track 3. The slotted guide track 3 guides the projection 4 via the entry section 3a in a direction 69 which encloses an angle α of less than 30° with the pull-out direction 68, which is directed counter to the direction of movement 44. The angle α increases continuously here from the start of the entry section 3a, in which said angle α is preferably less than 20°, particularly preferably less than 15°, as far as the end of the entry section 3a. The end of the entry section 3a and the start of a continuation section 3b of the slotted guide track 3 are therefore located wherever said angle α reaches the value of 30°. This angle α increases further over the continuation section 3b until this angle is at least more than 45°, and between 80° and 90° in the exemplary embodiment shown. FIG. 12 shows the angle α for a position of the projection 4 within the continuation section 3b, in which the angle α is somewhat more than 45°.

In the exemplary embodiment shown, the angle α, as soon as the latter has reached its maximum value, is constant as far as the end of the continuation section 3b. In other exemplary embodiments, a bent design of the slotted guide 3 toward that end of the continuation section 3b which is remote from the entry section 3a is also possible.

The projection 4 is therefore guided by the slotted guide track 3 at least over a part of the entry section of the slotted guide track 3, which part adjoins the beginning of the entry section 3a, at an angle of less than 20°, preferably less than 15°, with respect to the pull-out direction 68. At least over a part of the continuation section 3b, the projection 4 is guided by the slotted guide track 3 preferably in a direction which encloses an angle of more than 70°, preferably more than 80°, with the pull-out direction 68.

FIG. 12 illustrates three positions of the projection 4 on entry into the slotted guide track 3 by dashed lines. The first position shows precisely the first running of the projection 4 up against the side wall 45 of the slotted guide track 3, by means of which the retracting lever 5 is pivoted over the dead center (said side wall 45 is then, in the continuation section 3b, that side wall of the slotted guide track 3 which is located at the rear with respect to the direction of movement 44 of the component 1). The angle α is less than 20°, preferably less than 10°, here. In the second position, the projection 4 is already in the continuation section 3b, wherein the angle α here is scarcely larger than 45°. In the third position illustrated, the projection 4 is located in the continuation section 3b at the location which said projection takes up in the fully pushed-in state of the pull-out furniture part, the angle α here being between 80° and 90° in the exemplary embodiment. The side wall 45 runs in each case in the direction in which the projection 4 is guided by the slotted guide track 3, and therefore the angle which the side wall 45 encloses in each case with the pull-out direction 68 corresponds to the angle α between the direction of the guidance of the projection 4 and the pull-out direction 68.

Through the use of the described curved profile of the at least one slotted guide track 3, the force required for actuating the catch arm 5 when the component 1 is pushed in can be influenced. In particular, a type of transmission ratio arises through the profile of the entry section 3a. As a result, when the component 1 runs up against the catch arm 5 at a certain speed, at the beginning of the running-up operation, when the projection 4 is located in the region of the entry section 3a of the slotted guide track 3, the damping force acting on the component 1 is reduced. Furthermore, the dead center of the retracting spring 27 (if such a spring is present) can thereby be overcome by a smaller force which can be applied by the component 1.

FIG. 12 furthermore discloses a self-sealing section 3c of the slotted guide track 3. By means of said self-sealing section, the respective projection 4 can enter the continuation section 3b when the driver 2 is intended to run up against the retracting lever 5, which is in the main position thereof, as the component 1 is being pushed in. The self-sealing section runs at least substantially (i.e. there is a deviation of less than 15°) parallel to the pull-out direction 68. The self-sealing sections 3c are widened toward the open ends thereof by entry slopes. So that the projections 4 can enter through the self-sealing sections 3c, but the projections 4 cannot run out of the continuation sections 3b through the self-sealing sections 3c, the elasticities of the components can be utilized (such that the projection 4, as in FIG. 12, is offset with respect to the self-sealing section 3c when the component 1 has entered the latter). Provision could also be made, for example, for steps to be traveled over when the projections 4 enter through the self-sealing sections 3c, with the side members 2a, 2b containing the slotted guide tracks 3 being pushed apart. In addition or instead, additional spring-elastic latching elements which are arranged on the driver 2 could be provided.

When the catch arm 5 rotates back in the direction of rotation opposed to the arrow 26, the damper sleeve 18 is rotated by the catch arm 5 via the holding-open spring 25 such that the force which is to be overcome here can be exerted. This force is comparatively small, since the additional braking device is not effective in this direction of rotation. If, however, the application of such a force is not desired, a freewheel can be provided between a part connected to the wraparound part 31, optionally via the holding-open spring 25 and/or the overload spring 32, and the catch arm 5, said freewheel being closed in the direction of rotation corresponding to the arrow 26 and opening in the opposed direction of rotation. Such freewheels are known, also in conjunction with dampers.

In a modified embodiment in relation to the embodiment illustrated, the catch arm 5 could also be mounted pivotably on the damper sleeve 18, specifically about an axis of rotation parallel to the axis 6. The wraparound part 31 or the overload spring 32 connected to the wraparound part 31 could then be connected to the catch arm radially outside said pivot axis. By means of a restoring spring, the catch arm 5 could be acted upon into a starting position with respect to the pivot axis thereof in relation to the damper sleeve 18. During the damping of the movement of the component 1, when the catch arm 5 is pivoted to a greater or lesser extent about the pivot axis counter to the force of the restoring spring acting thereupon, since the rotation of the pivot axis about the axis 6 is braked by the braking force of the braking device, a tensile force of greater or lesser size is exerted on the wraparound part 31, as a result of which, given a sufficiently high rotational speed of the damper sleeve 18, the coupling is closed.

Other linearly displaceably mounted components than pull-out furniture parts can also be damped by the braking device. Furthermore, a damping of rotatably mounted components is also possible, wherein, depending on the application, a retracting spring 27 can be provided or else can be omitted. The component to be damped can be connected to the device optionally in a different manner than via a radially projecting catch arm (i.e. catch lever) which is mounted rotatably about the axis 6, for example via a pinion which is mounted rotatably about the axis 6 and is connected to the wraparound part 31, optionally via an overload spring 32.

The wraparound part 31 can also be formed by a wire, in particular spring wire, or a cord, instead of by a band. The wraparound angle of the wire or of the cord is advantageously between 250° and 720°.

A kinematic reversal is also possible, wherein the inner braking part 10, or the unit comprising the inner braking part 10 and optionally also the housing part 28, is driven by the component 1 to be damped, and the wraparound part 31 is secured at its front connecting point 33 and the damper sleeve 18 is secured via said wraparound part. The previously described, driven damper surface 21 illustrated in the drawing then becomes the secured damper surface, and vice versa. The previously described, driven additional damper surface 19 illustrated in the drawing then becomes the secured additional damper surface, and vice versa. In this connection, the driven additional damper surface is driven by the movement of the component irrespective of whether the coupling is open or closed, whereas the secured additional damper surface is secured only in the closed state of the coupling (and rotates together with the driven additional damper surface in the open state of the coupling). The wraparound part could then also be secured by a different part than by an arm protruding from the axis 6 (corresponding to the catch arm 5).

Figure 13:
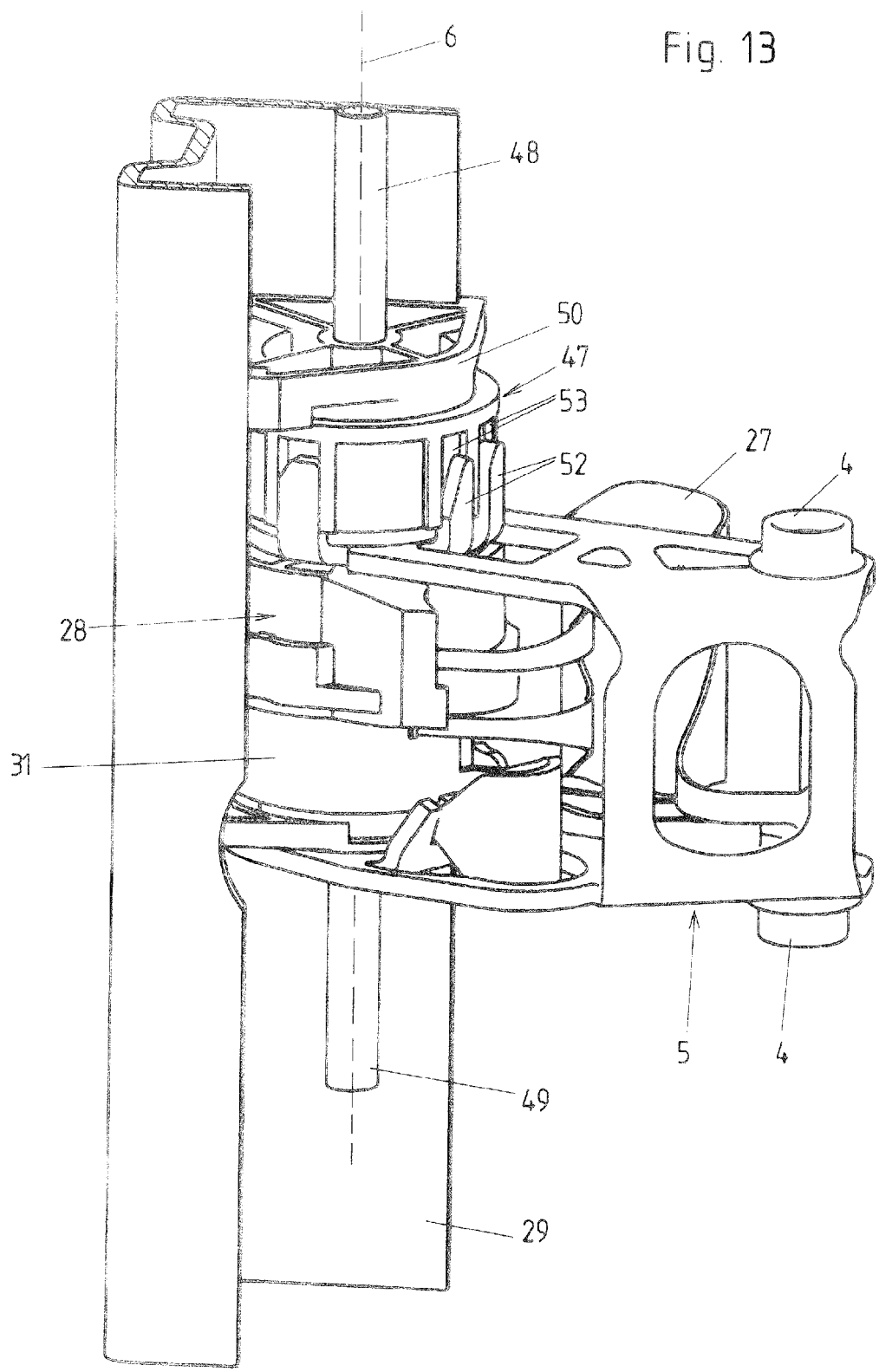
FIG. 13 shows a slightly modified variant embodiment of the device with additional elements for forming a pull-out blocking device.

FIGS. 13 and 14 disclose a modification of the second embodiment of the invention, the modification constituting the integration of a pull-out blocking device into a device according to the invention. Apart from the differences described below, the device according to the invention is designed in the same manner as the embodiment of the device according to the invention that is described with reference to FIGS. 1 to 12.

Pull-out blocking devices serve to the effect that, of a plurality of pull-out furniture parts which are coupled to one another via the pull-out blocking device, only one can be pulled out at the same time. Only after this pull-out furniture part is pushed in can another be pulled out. Furthermore, if desired, central locking can be provided via such a pull-out blocking device.

In the embodiment of the pull-out blocking device that is shown in the exemplary embodiment, blocking rods which have only a limited clearance (i.e. a limited amount of play) for the displacement thereof run between actuating parts, which are assigned to the individual pull-out furniture parts. If one of the pull-out furniture parts is extended, the two blocking rods interacting with the actuating part (if a central pull-out furniture part is involved, blocking rods are arranged on both sides of the actuating part thereof) are moved apart from each other by the actuating part. As a result, the available clearance is used up, and therefore the blocking rods interacting with another of the actuating parts can no longer move apart from each other and therefore a further pull-out furniture part can no longer be pulled out. The actuating part of an end-side pull-out furniture part can also interact only with one blocking rod which displaces said actuating part as said pull-out furniture part is being pulled out. The basic design of the pull-out blocking device corresponds in this respect to the prior art, for example in a manner corresponding to the documents mentioned at the beginning regarding pull-out blocking devices.

The unit formed by the inner braking part 10 and housing part 28 has a cavity 46 which extends in the direction of the axis 6 and passes completely through the unit. Parts of the pull-out blocking device can be accommodated by said cavity.

By means of a part which is rotated about the axis 6 as the pull-out furniture part is being pulled out and pushed in, by means of the catch arm 5 in the exemplary embodiment shown, an actuating part 47 assigned to said pull-out furniture part is adjusted. If further pull-out furniture parts are arranged above and below the pull-out furniture part, the actuating part 47 displaces an upper blocking rod 48 upward and/or a lower blocking rod 49 downward. If the lowermost pull-out furniture part is involved, only one upper blocking rod 48 could be displaced upward. If the uppermost pull-out furniture part is involved, only a lower blocking rod 49 could be displaced downward.

In this exemplary embodiment, the actuating part 47 is designed as a cam disk which is rotatable about the axis 6. A cam follower part 50, 51 is respectively fitted on the blocking rods 48, 49, which are actuated by the actuating part 47, wherein the cam follower parts 50, 51 are secured against rotation about the axis 6.

When the actuating part 47 is rotated about the axis 6 in a first direction of rotation, the two cam follower parts 50, 51 are pushed apart (by displacement of at least one of the blocking rods parallel to the axis 6), and said cam follower parts can approach each other again on rotation of said actuating part in the opposed direction of rotation (corresponding to the arrow 26).

The actuating part 47 can be displaced by a limited displacement distance in relation to the catch arm 5 in the direction of the axis 6, wherein said actuating part nevertheless continues to be connected to the catch arm 5 for rotation therewith. For this purpose, in the exemplary embodiment, the catch arm 5 has claws 52 which extend in the direction of the axis 6 and engage in recesses 53 of the actuating part 47.

A displacement of at least one of the blocking rods 48, 49 by an actuating part assigned to one of the pull-out furniture parts, without the connection of the rest of the actuating parts to the respectively associated catch arm for rotation therewith being released, is thereby made possible.

The cam follower part 50 has an axial extension 50*a* with latching tongues 50*b*. The cam follower part 51 has an axial extension 51*a* with latching tongues 51*b*.

The cam follower part 51 can be plugged by the extension 51*a* into the cavity 46, and the cam follower part 50 can be plugged by the extension 50*a* through a central opening in the actuating part 47 into a central opening in the cam follower part 51. In order to facilitate assembly, the parts are held together by the latching tongues 50*b*, 51*b* before the device is fitted together, with the required movement margins being maintained after the assembly.

The blocking rods 48, 49 could also be actuated in another manner. For example, the actuating part could be designed in the form of a cam part which is pivotable about a pivot axis lying at right angles to the axis 6. The actuating part interacts here with the end of the at least one adjacent blocking rod 48, 49, or with a part connected to said blocking rod, in order to displace the blocking rod 48, 49, during the pivoting thereof about the pivot axis, in the respective direction parallel to the axis 6. The actuating part is coupled here to the catch arm 5 (for example, via a driver part in the shape of a fork and a pin) in such a manner that said actuating part is pivoted when the catch arm 5 is rotated about the axis 6.

The pull-out furniture parts which are coupled to one another by the pull-out blocking device could also be arranged next to one another instead of vertically one above another. The blocking rods 48, 49 and the axis 6 would then be arranged horizontally. The terms "at the top" and "at the bottom" used in the preceding description would then have to be replaced by "on the left" and "on the right". Arrangements of the blocking rods 48, 49 and the axis 6 in a manner inclined in relation to the horizontal are basically also conceivable and possible.

In the previously described exemplary embodiments, the axis of the braking device corresponds in each case to the axis of the additional braking device, as is preferred. However, designs are also conceivable and possible in which said axes, for example, lie parallel to each other, but are at a distance from each other. Angular alignments between said axes are in principle also possible. Corresponding transmission members, for example gearwheels, would then have to be provided between the braking device and the additional braking device. The coupling would then be formed preferably coaxially with the braking device or with the additional braking device.

KEY FOR THE REFERENCE NUMBERS

1 Component
2 Driver
3 Slotted guide track
3*a* Entry section
3*b* Continuation section
3*c* Self-sealing section
4 Projection
5 Catch arm
6 Axis
10 Inner braking part
11 Coupling-up part
14 First coupling surface
15 Second coupling surface
18 Damper sleeve
19 Driven additional damper surface
20 Secured additional damper surface
21 Driven damper surface
22 Secured damper surface
23 Damping medium
25 Holding-open spring
26 Arrow
27 Retracting spring
28 Housing part
29 Mounting rail
30 Furniture body
31 Wraparound part
32 Overload spring
33 Front connecting point
34 Rear connecting point
35 Slot
36 Projection
39 Sealing ring
40 Sealing ring
41 Sealing ring
42 Sealing ring
43 Latching arm
44 Direction of movement
45 Side wall
46 Cavity 47 Actuating part
47a Actuating arm
48 Blocking rod
49 Blocking rod
50 Cam follower part
50a Extension
50b Latching tongue
51 Cam follower part
51a Extension
51b Latching tongue
52 Claw
53 Recess
68 Pull-out direction
69 Direction

The invention claimed is:

1. A device for damping movement of a movably mounted component, comprising:
   a braking device which has at least one driven damper surface which is rotatable in relation to at least one secured damper surface about an axis of the braking device, the braking device is driven by movement of the component and, with the at least one secured damper surface, encloses at least one gap containing a viscous damping medium which brings about a braking force of the braking device, said braking force braking rotation of the at least one driven damper surface about the axis of said braking device when the at least one driven damper surface is rotated in relation to the at least one secured damper surface, wherein the braking force exerted by the braking device is dependent on a rotational speed of the at least one driven damper surface,
   an additional braking device which has at least one additional damper surface which is rotatable in relation to at least one secured additional damper surface about an axis of the additional braking device, and
   a coupling, having a closed and an open state, in the closed state of said coupling the at least one additional damper surface of the additional braking device rotates about the axis of the additional braking device when the at least one driven damper surface rotates about the axis of the braking device, so that the additional braking device exerts an additional braking force, and in the open state of said coupling, the at least one additional damper surface of the additional braking device does not rotate about the axis of the additional braking device when the at least one driven damper surface rotates about the axis of the braking device,
   wherein the coupling is actuated by the braking force exerted by the braking device, so that the coupling is in the open state when the rotational speed of the at least one driven damper surface is below a threshold value, and is in the closed state when the rotational speed of the at least one driven damper surface is above the threshold value.

2. The device as claimed in claim 1, wherein the at least one driven damper surface and the at least one additional damper surface which is driven in the closed state of the coupling are coaxial.

3. The device as claimed in claim 1, wherein the at least one driven additional damper surface, with at least one secured additional damper surface, encloses at least one gap containing a viscous damping medium which brings about a braking force of the additional braking device, the braking force braking the rotation of the at least one driven additional damper surface about the axis of said additional braking device during rotation of the at least one driven additional damper surface in relation to the at least one secured additional damper surface, wherein the braking force of the additional braking device is dependent on the rotational speed of the at least one driven additional damper surface.

4. The device as claimed in claim 3, wherein the coupling has a wraparound part which is flexible and which surrounds a coupling-up part at least by an angle of more than 90° about an axis of the coupling, the wraparound part is connected to a damper sleeve which has at least one of the driven or secured damper surfaces of the braking device, and the wraparound part and the coupling-up part are rotatable in relation to each other when the rotational speed of the at least one driven damper surface is below the threshold value, and are connected to each other for rotation therewith when the rotational speed of the at least one driven damper surface lies above the threshold value.

5. The device as claimed in claim 4, wherein the wraparound part extends from a front connecting point to a rear connecting point in a first direction of rotation about the axis of the coupling, the rear connecting point of the wraparound part is connected to the damper sleeve, and movement of the component to be damped is transmitted to the front connecting point of the wraparound part, and the coupling-up part has the additional damper surface which is driven in a closed state of the coupling, or at least one of the driven additional damper surfaces, and the secured damper surface which interacts with said additional damper surface is arranged on a secured inner braking part, or
movement of the component to be damped is transmitted to the inner braking part, and the inner braking part has the driven additional damper surface, or at least one of the driven additional damper surfaces, which interacts with the additional damper surface which is arranged on the coupling-up part and is secured in a closed state of the coupling, and the wraparound part is secured at the front connecting point.

6. The device as claimed in claim 5, wherein the axis of the coupling corresponds to at least one of the axis of the braking device or to the axis of the additional braking device.

7. The device as claimed in claim 6, wherein at least in a state of the device in which said device damps movement of the component, a holding-open spring acts upon the rear connecting point of the wraparound part in relation to the front connecting point of the wraparound part in a second direction of rotation, which is opposed to the first direction of rotation, about the axis of the first braking device.

8. The device as claimed in claim 4, wherein the damper sleeve has the driven damper surface, or at least one of the driven damper surfaces, and the driven damper surface, or at least one of the driven damper surfaces, is driven via the wraparound part, and the coupling-up part, or a part which is rotated thereby, has the additional damper surface which is driven in the closed state of the coupling, or at least one of the additional damper surfaces which is driven in the closed state of the coupling.

9. The device as claimed in claim 4, wherein, in the event of a rotational speed of the at least one driven damper surface above the threshold value, the wraparound part is connected frictionally to the coupling-up part.

10. The device as claimed in claim 1, further comprising an overload spring arranged in a transmission path of force which is transmitted from the component to be damped to the device and drives the device.

11. The device as claimed in claim 10, wherein the overload spring is arranged in the transmission path between the component and the wrap around part.

12. The device as claimed in claim 1, wherein the component to be damped is a pull-out furniture part which, when being pushed in, couples up to a catch arm of the device, said catch arm is pivotable about an axis, which coincides with the axis of at least one of the braking device or the axis of the additional braking device, from a waiting position into a main position and, in the process, rotates the at least one driven damper surface of the braking device about the axis of the braking device.

13. The device as claimed in claim 12, wherein the catch arm is acted upon by a retracting spring, the retracting spring is tensioned to a greater extent in the waiting position of the catch arm than in the main position of the catch arm, and, when the catch arm is adjusted from the main position into the waiting position, a dead center of the retracting spring is overcome.

14. The device as claimed in claim 1, wherein a driver, which has at least one slotted guide track, is arranged on the component to be damped or on a part of the device that is pivotable about the axis by the component to be damped, and at least one projection is arranged on the other of said component to be damped or on a part of the device that is pivotable about the axis by the component to be damped, said projection entering into the at least one slotted guide track during the damping of the component, wherein the slotted guide track has an entry section, via which the projection is guided in a direction which encloses an angle ($\alpha$) of less than 45° with a direction which is opposed to a direction of movement of the component, and a continuation section which adjoins the entry section and via which the projection is guided in a direction which encloses an angle of more than 45° with the direction which is opposed to the direction of movement of the component.

15. A device for damping movement of a movably mounted component, comprising:
  a braking device which has at least one driven damper surface which is rotatable in relation to at least one secured damper surface about an axis of the braking device, the braking device is driven by movement of the component and, with the at least one secured damper surface, encloses at least one gap containing a viscous damping medium which brings about a braking force of the braking device, said braking force braking rotation of the at least one driven damper surface about the axis of said braking device when the at least one driven damper surface is rotated in relation to the at least one secured damper surface, wherein the braking force exerted by the braking device is dependent on a rotational speed of the at least one driven damper surface,
  an additional braking device which has at least one additional damper surface which is rotatable in relation to at least one secured additional damper surface about an axis of the additional braking device, wherein the at least one secured additional damper surface is secured against a rotation about the axis of the additional braking device, and
  a coupling, having a closed and an open state, in the closed state of said coupling the at least one additional damper surface of the additional braking device rotates in relation to the at least one secured additional damper surface about the axis of the additional braking device when the at least one driven damper surface rotates about the axis of the braking device, so that the additional braking device exerts an additional braking force, and in the open state of said coupling, the at least one additional damper surface of the additional braking device does not rotate about the axis of the additional braking device when the at least one driven damper surface rotates about the axis of the braking device,
  wherein the coupling is actuated by the braking force exerted by the braking device, so that the coupling is in the open state when the rotational speed of the at least one driven damper surface is below a threshold value, and is in the closed state when the rotational speed of the at least one driven damper surface is above the threshold value.

\* \* \* \* \*